Sept. 14, 1943.  S. P. MILLER  2,329,638
NAPHTHALENE VAPORIZATION AND OXIDATION
Filed July 5, 1940
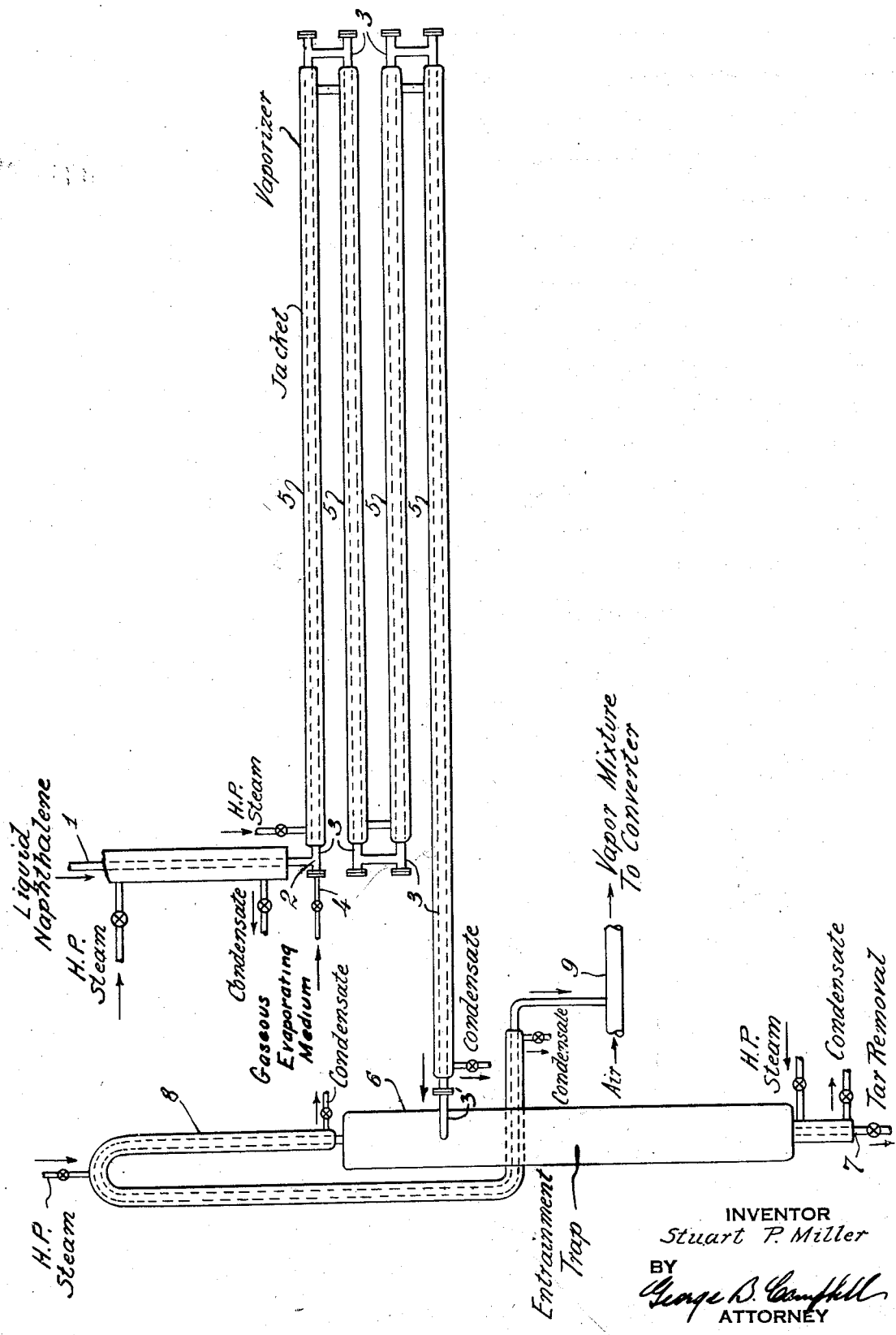
INVENTOR
Stuart P. Miller
BY
George B. Campbell
ATTORNEY Patented Sept. 14, 1943

2,329,638

UNITED STATES PATENT OFFICE 2,329,638

NAPHTHALENE VAPORIZATION AND OXIDATION

Stuart Parmelee Miller, Scarsdale, N. Y., assignor, by mesne assignments, to Allied Chemical & Dye Corporation, a corporation of New York Application July 5, 1940, Serial No. 344,187

4 Claims. (Cl. 260—342)

This invention relates to improvements in catalytic oxidation and is particularly concerned with the preparation of naphthalene vapors so as to form mixtures suitable for subjection to catalytic vapor-phase oxidation.

The present invention has for an object improvements in the manufacture of partial oxidation products of organic chemical substances by catalytic processes of the type herein referred to, whereby a uniform vapor stream of normally solid vaporizable organic chemical substances suitable for mixing with oxidizing gases may be easily and economically obtained and consequently high yields and uniformity of the desired product may be secured.

A further object of the present invention is to provide a satisfactory and efficient apparatus for carrying out such improved processes.

Other objects of the invention will in part be obvious and will in part appear hereinafter.

The preparation of naphthalene vapor mixtures suitable for catalytic oxidation has long been practiced and forms an important part of the vapor phase catalytic oxidation process. The commercial semi-refined and purified grades of naphthalene, having solidification points of approximately 74° C. and 78° C., respectively, normally contain approximately 88% and approximately 96% naphthalene, respectively. The remainder comprises largely hydrocarbons with relatively small amounts of phenols and bases, e. g., homologues of pyridine, quinoline, etc. Of the hydrocarbons considerable percentages may be unsaturated hydrocarbons which, upon exposure to elevated temperatures, may not only polymerize to resinous or tarry materials, but may degrade to carbonaceous materials highly pyrophoric in nature, which may float in and be carried by the gases, or may form sooty deposits on conduits and apparatus surfaces. Not only the hydrocarbon impurities, but to a small degree other components such as the naphthalene itself may degrade or polymerize to give troublesome deposits.

In naphthalene vaporization processes of the prior art, difficulties have been encountered in removing the impurities naturally present in naphthalene and also in minimizing the formation of additional impurities or tarry residues in the heating and evaporation of the naphthalene. In addition to the formation of resinous and tarry materials in the heating and vaporization of naphthalene, it has been found that, particularly at high temperatures, pyrophoric carbonaceous matter is formed which becomes entrained in the vapor mixture and may be carried over to the catalytic converters. This material may cause flash-backs, fires, and explosions which represent a serious hazard.

In one form of the prior art vaporizers molten naphthalene in a quiescent state is exposed to a flow of gaseous evaporating medium passing over its surface. The non-volatile impurities in the naphthalene collect in the vaporizer and can be drawn off from time to time. In another type of apparatus a gaseous evaporating medium is blown through a mass of liquid naphthalene. These types of vaporizers are subject to the disadvantage of relatively low capacity and correlatively large size and cost.

While naphthalene vapors may be produced by simple boiling, this method of obtaining naphthalene vapors for catalysis has the disadvantage that because of the relatively high temperature necessary to boil naphthalene at the elevated pressures normally involved, the naphthalene has a tendency to polymerize and carbonize. The tarry and carbonaceous deposits formed coat the boiler heating surfaces, thus cutting down heat transfer and eventually may cause a shut-down. The naphthalene vapor from the boiler is mixed with heated air and then passed to the catalytic converter in which oxidation of the naphthalene occurs. The mixture of air and naphthalene vapor is normally at a pressure somewhat above atmospheric, e. g., of the order of 20 to 30 pounds absolute. Some carbonaceous matter is entrained with the vapor going over to the converter and may cause fires and flash-backs.

Another vaporization method which has been suggested involves injecting the naphthalene into a hot gaseous medium, the heat of vaporization being supplied by the sensible heat of the gaseous medium. This method requires either very hot gases, in which event carbonization may occur, or very large volumes of gas, in which event not only must the vaporizer be designed especially to handle the large quantities of gas but if a gas other than air is employed, a substantial dilution of the oxygen content of the reaction mixture is sustained.

In accordance with the present invention naphthalene in liquid phase is brought into contact with a gaseous vaporizing medium, such as steam, air, nitrogen, or carbon dioxide, and the naphthalene and gaseous vaporizing medium are introduced into an indirectly heated vaporizing chamber maintained at a temperature sufficient to vaporize substantially all of the naphthalene and the naphthalene and gaseous vaporizing medium are passed through the chamber at a sufficient velocity to maintain them in a state of turbulent flow in their passage through the chamber.

The preferred form of the invention comprises passing the molten naphthalene and steam through an elongated tube which is heated by condensing steam of appropriate pressure in an external jacket. The molten naphthalene and gaseous vaporizing medium may be brought into contact either with or without mechanical mixing and the contact may take place either before the heating chamber or in the heating chamber. It is preferred to control the heat input so that the vapor mixture obtained is at a temperature below the boiling point of naphthalene at the pressure involved and only slightly above the dew point of naphthalene. This vapor mixture is then passed through an entrainment trap in order to remove such entrained liquid material as may be present. The mixture thus purified may be mixed with a gas containing molecular oxygen, e. g. air, to adjust the proportion of naphthalene to that desired in the reaction mixture and to supply the necessary oxygen for the reaction if none or insufficient is present in the evaporating medium. For this purpose any appropriate form of mixer may be used.

The apparatus requirements for conduct of the process of the invention are unusually modest in comparison with the requirements of most of the prior art processes. For example, a satisfactory apparatus for handling the large loads necessary in commercial operations can be built of a few sections of standard pipe.

Remarkably little degradation or polymerization of impurities or other components to form carbonaceous and tarry matter occurs in the process of the invention. This advantage probably is due to the fact that the naphthalene is vaporized at a very rapid rate and is present in the vaporizer for only a very short time. There is accordingly little opportunity for degradation and polymerization to take place.

The preferred apparatus of the invention can be used with substantial variations in the ratio of inert gaseous medium to naphthalene and also with substantial variations in the temperature and pressure of the inert gaseous medium as well as in the temperature of the external heat source. It has been found, however, that certain ranges of conditions give much better practical operating results than conditions outside of those ranges. Thus the temperature of the external heating medium should preferably be within the range of about 150° to 240° C., particularly 200° to 240° C. A suitable temperature range for the evaporating medium is from 120° to 210° C.

Where it is desired to employ an inert gaseous evaporating medium, ordinary low pressure steam such as is normally available in a plant may be used.

The ratio of naphthalene to gaseous medium may be varied within wide limits. It is preferred to employ a ratio between about 1:2 and 2:1 by weight of liquid to gaseous medium. To maintain turbulent flow, the gas velocity in the vaporizer should be sufficient to provide a Reynolds' number above about 3000, and particularly a Reynolds' number above about 90,000. Thus, for an apparatus such as a simple 4-inch pipe, a gas entrance velocity between about 30 and about 120 feet per second and an exit velocity between about 45 and about 140 feet per second have been found effective. The length and cross-sectional area of the vaporizer will depend upon the quantity of naphthalene to be vaporized and upon the temperature of the external heating medium. But in general it is preferred to provide a chamber sufficiently long so that an exit vapor temperature from about 170° to 200° C. is obtained when operating with the preferred temperatures, ratios, and velocities.

The pressure inside the vaporizer may be varied but normally should be only sufficient to provide the desired rate of flow into the main air line to which the vapor is being fed. Ordinarily not over 20 pounds gauge pressure exit the vaporizer is used.

The apparatus illustrated in the drawing is a form of apparatus which I have found particularly satisfactory for carrying out the process of my invention. It will be understood, however, that this apparatus is to be taken merely as illustrative of one means of practicing the invention and not as a limitation on the invention.

The apparatus comprises a jacketed pipe 3 having a jacketed inlet pipe 1 for introducing liquid naphthalene and an inlet pipe 4 for introducing a gaseous evaporating medium. The vaporizer 3 consists of several lengths of standard pipe provided with a jacket 5. The jacket 5 may be made of standard pipe slightly larger in diameter than the pipe of the vaporizer 3. For instance, if the jacketing fluid is to be maintained at elevated pressure, 4-inch high pressure pipe with a jacket of 6-inch high pressure pipe may be used. Vaporizer 3 is connected with entrainment trap 6 by a pipe connection 3' disposed tangentially of the trap to impart a whirling motion to vapors entering the trap. The entrainment trap 6 is provided at the bottom with a jacketed liquid drain pipe 7. From the top of trap 6 jacketed pipe 8 leads to the main converter air conduit 9 leading to the catalytic converter.

If desired, a mixing or atomizing device may be used at the point 2 where the gaseous evaporating medium and naphthalene meet. Normally, however, such devices are unnecessary.

The following example illustrates the applicant's process using a vaporizer of the type illustrated in the drawing and employing low pressure steam as the evaporating medium and high pressure steam as the jacketing medium.

*Example:*

Liquid naphthalene at between 100° and 200° C. and steam at about 148° C. (50 pounds per square inch gauge pressure) are introduced at 1 and 4 in a ratio of about 1.1 pounds of steam per pound of naphthalene and at a rate sufficient to provide an average gas velocity in the vaporizer near the entrance of about 70 feet per second and are heated by high pressure steam at a temperature of about 205° C. in jacket 5. The vapor mixture of steam and naphthalene leaves the vaporizer 3 at a temperature of about 185° C. and an exit velocity of about 85 feet per second under a pressure of about 17 pounds per square inch gauge pressure. After passing through the entrainment trap 6 to remove liquid residue which may amount in the case of well-purified naphthalene to not over 1 per cent of the weight of naphthalene feed, the vapor mixes with air flowing through conduit 9 to provide a weight ratio of naphthalene to total gas between about 1 to 25 and 1 to 50 preparatory to going to the converter wherein the naphthalene is oxidized to phthalic anhydride.

I claim:

1. A process of supplying a mixture of naphthalene vapors and oxidizing gas to a system for the vapor phase oxidation of naphthalene which comprises introducing molten naphthalene and gaseous vaporizing medium into an elongated vaporizing chamber, heating the chamber indirectly externally by a fluid heating medium which is at a temperature between 150° C. and 240° C., passing the naphthalene and vaporizing medium through the chamber at a sufficient velocity so the Reynolds' number of the gas stream is at least 3,000 throughout substantially all of said elongated chamber and the naphthalene and vaporizing medium are maintained in a state of turbulent flow in their passage through said chamber, whereby a continuous flowing stream of the gaseous vaporizing medium flows throughout substantially the entire length of the chamber and passes over liquid naphthalene adhering to the walls of the chamber, supplying substantially all of the heat required to vaporize the naphthalene indirectly to the naphthalene by said fluid heating medium, coordinating the proportions of gaseous vaporizing medium and the heating of said chamber so as to vaporize substantially all of the naphthalene in the elongated chamber and maintain the vapor mixture leaving the elongated chamber at a temperature between 170° and 200° C., thereby minimizing polymerization and coking of the naphthalene, and mixing the vapor with oxidizing gas required for oxidizing the naphthalene.

2. A process as defined in claim 1 in which the gaseous vaporizing medium is steam.

3. A process as defined in claim 1 in which steam is employed as the gaseous vaporizing medium and the naphthalene and steam are introduced into the chamber in a weight ratio between 1:2 and 2:1.

4. A process as defined in cliam 1 in which steam is employed as the gaseous vaporizing medium, and the naphthalene and steam are introduced into the chamber in a weight ratio between 1:2 and 2:1, and are passed through the chamber at a sufficient velocity so the Reynolds' number of the gas stream in the chamber is at least 90,000.

STUART PARMELEE MILLER.